United States Patent [19]

Masu et al.

[11] Patent Number: 5,708,844
[45] Date of Patent: Jan. 13, 1998

[54] CHARACTER RESOURCE MANAGEMENT SYSTEM FOR EFFECTIVELY MANAGING CHARACTER RESOURCES TO BE LOADED INTO AN OUTPUT DEVICE

[75] Inventors: Minoru Masu; Shinichi Tsuji; Masahito Noguchi; Katsumi Fujisue; Yoshio Shiromoto; Hiromi Shimakata; Takasi Funyu; Toshimi Sugai, all of Kawasaki, Japan

[73] Assignee: Fujitsu Limited, Kawasaki, Japan

[21] Appl. No.: 806,653

[22] Filed: Feb. 26, 1997

Related U.S. Application Data

[63] Continuation of Ser. No. 441,003, May 15, 1995, abandoned, which is a continuation of Ser. No. 858,134, Mar. 27, 1992, abandoned.

[30] Foreign Application Priority Data

Mar. 29, 1991 [JP] Japan ................... 3-065183

[51] Int. Cl.⁶ ........................................ G06F 3/14
[52] U.S. Cl. ........................................ 395/805
[58] Field of Search ........................ 395/761, 805, 395/779, 774, 788, 791

[56] References Cited

U.S. PATENT DOCUMENTS

| | | | |
|---|---|---|---|
| 4,686,525 | 8/1987 | Nagata | 340/790 |
| 4,837,712 | 6/1989 | Shibamiya | 395/150 |
| 4,897,638 | 1/1990 | Kokunishi et al. | 345/142 X |
| 5,081,594 | 1/1992 | Horsley | 395/150 |
| 5,093,903 | 3/1992 | Sudoh et al. | 395/102 |
| 5,137,379 | 8/1992 | Ukai et al. | 395/110 X |
| 5,142,613 | 8/1992 | Morikawa et al. | 395/150 X |
| 5,175,811 | 12/1992 | Sone et al. | 395/150 |
| 5,233,685 | 8/1993 | Landes et al. | 395/145 X |
| 5,280,577 | 1/1994 | Trevett et al. | 395/150 |

FOREIGN PATENT DOCUMENTS

| | | |
|---|---|---|
| 0 267 418 | 5/1988 | European Pat. Off. |
| 0 356 076 | 2/1990 | European Pat. Off. |
| 0 382 402 | 8/1990 | European Pat. Off. |

Primary Examiner—Phu K. Nguyen
Assistant Examiner—Cliff N. Vo
Attorney, Agent, or Firm—Staas & Halsey

[57] ABSTRACT

A character resource management system manages character resources to be down loaded into an output device. The character resource management system includes a first management unit for managing character styles of the character resources which may be down loaded into the output device and a second management unit for managing character pattern sets used for the character styles managed by the first management unit. Each of the character pattern sets managed by the second management unit corresponds to one of characteristics of output devices which may be coupled to the character resource management system. The character resource management system additionally comprises a third management unit for managing information regarding character patterns identified by the character pattern sets and code systems which may be used for the character pattern sets, and for managing character code pattern information corresponding to each code in each code system without duplication of the character code pattern information. A fourth management unit is included for managing sharing relationships between a plurality of code systems, each of the sharing relationships representing codes in the plurality of code systems sharing the same character code pattern information. A character resource formed of information managed by the above first to fourth management units is down loaded into the output device.

6 Claims, 11 Drawing Sheets

F I G. 2B

| STYLE | ... | BASIC | PITCH | ... | VARIABLE |
|---|---|---|---|---|---|
| STYLE | ... | GOTHIC 1 | PITCH | ... | FIXED |

COMMON STYLE INF.

| STYLE | ... | MING-STYLE 1 | PITCH | ... | VARIABLE |
|---|---|---|---|---|---|
| CODE SYSTEM | ... | JEF, EBCDIC, ......... | | | |
| TYPICAL VALUES OF STYLE CONSTITUTION | | TOP, HALF, CAP, BOTTOM, ENDS OF LETTERS ......... | | | |
| CANDIDATES OF CHARACTER PATTERN SET | | MING-STYLE A.24, MING-STYLE A.30, ......... | | | |

INDIVIDUAL STYLE INF.

| CODE SYS. | CODES | USING STATE OF TYPICAL VALUES | INDIVIDUAL VALUES OF STYLE CONSTITUTION |
|---|---|---|---|
| ... | | | |
| JEF | X '0000' | UNUSED | |
| ... | | | |
| OEF | X 'OXOX' | USING | LEFT/RIGHT OF LETTERS |
| ... | | | |

FIG. 2C

| CHARACTER PATTERN SET | MING-STYLE A.30 | PITCH | ... | VARIABLE |

| CHARACTER PATTERN SET | MING-STYLE A.24 | PITCH | ... | VARIABLE |

COMMON CHARACTER PATTERN INF.

| CODE SYSTEM | JEF, EBCDIC, ......... |
|---|---|
| CHARACTER PATTERN | OUTLINE FONT |
| RANGE OF SIZE VARIATION | MAX ... WIDTH/HEIGHT<br>MIN ... WIDTH/HEIGHT |
| TYPICAL VALUES OF CHARACTER PATTERN | PATTERN FACE ... W/H<br>BODY FACE ... W/H<br>OFF SET ... X/Y |
| CORRECTION INF. | PATTERN FACE WIDTH AFTER SIZE VARIATION : H-LINE WIDTH<br>PATTERN FACE HEIGHT AFTER SIZE VARIATION : W-LINE WIDTH |

INDIVIDUAL CHARACTER PATTERN INF.

| CODE SYS. | CODES | USING STATE OF TYPICAL VALUES | INDIVIDUAL VALUES OF CHARACTER PATTERN | PATTERN DATA |
|---|---|---|---|---|
| ... | ... | ... | ... | ... |
| JEF | X '0000' | UNUSED | ...... | ...... |
| ... | ... | ... | ... | ... |
| CEF | X '0X0X' | USING | — | ...... |
| ... | ... | ... | ... | ... |

| SHARING CODE SYS. (A) | SHARED CODE SYS. (B) |
|---|---|
| 0 0 0 1 | UNSHARING |
| ~ | ~ |
| 0 1 0 2 | UNSHARING |
| 0 1 0 3 | b 0 1 0 3 |
| 0 1 0 4 | UNSHARING |
| ~ | ~ |
| 0 2 0 1 | b 0 2 0 1 |
| ~ | ~ |
| F F F F | UNSHARING |

CHARACTER RESOURCE MANAGEMENT SYSTEM FOR EFFECTIVELY MANAGING CHARACTER RESOURCES TO BE LOADED INTO AN OUTPUT DEVICE

This application is a continuation of application Ser. No. 08/441,003, filed May 15, 1995, now abandoned, which is a continuation of application Ser. No. 07/858,134, filed Mar. 27, 1992, now abandoned.

BACKGROUND OF THE INVENTION (1) Field of the Invention

The present invention generally relates to a character resource management system, and more particularly to a character resource management system in which a character resource to be loaded down into an output device (such as a printer) is effectively managed.

(2) Description of Related Art

In a printing system, a character resource (including information regarding a code system, a character style, character patterns (fonts) and the like) which is required for a printing of printing data is loaded down into a printer before printing. Then the printer prints out the printing data in accordance with the character resource loaded down therein. It is desired that a process for loading down the character resource be effectively performed at a high speed.

The character resource has three attributes; a character style, a code system and character code pattern information. The character code pattern information includes information regarding types of character patterns (fonts), a size of each character pattern, character patterns and the like. In a conventional printing system, character styles and code systems are treated as information attendant to the character code pattern information, so that the character resource is managed mainly based on the character code pattern information. That is, when the character code pattern information is fixed, the character style and the code system are naturally fixed.

Further, in the conventional system, a character weight of each character pattern set is fixed based on a character size. The character weight represents a thickness of each line forming a character. For example, in a case of a character of a Ming-style (which is one of Japanese character styles) having a character size falling within a range of 6-8 point, the character has a first character weight. In a case of a character of a Ming-style having a character size falling within a range of 9-11 point, the character has a second character weight. In a case of a character of a Ming-style having a character size falling within a range of 12-20 point, the character has a third character weight. In a case of a character of a Ming-style having a character size falling within a range of 20-100 point, the character has a fourth character weight. The first character weight represents the thinest line, and the fourth character weight represents the thickest line. The thickness represented by the second character weight is less than that represented by the third character weight.

In the above conventional system, when a first code system for accessing a first character code pattern information and a second code system for accessing a second character code pattern information differ from each other, even if the first and second character code pattern information are the same, they must be individually managed. That is, even if the first and second character code pattern information are the same, they must be individually stored in a memory.

SUMMARY OF THE INVENTION

Accordingly, a general object of the present invention is to provide a novel and useful character resource management system in which the disadvantages of the aforementioned prior art are eliminated.

A more specific object of the present invention is to provide a character resource management system in which character code pattern information of character recources can be effectively managed.

The above objects of the present invention are achieved by a character resource management system for managing character resources to be down loaded into an output device. The character resource management system comprises a: first management unit for managing character styles of the character resources which may be loaded down into the output device. Additionally, the character resource management system comprises a second management unit, coupled to the first management unit, for managing character pattern sets used for the character styles managed by the first management unit. Each of the character pattern sets corresponds to one of characteristics of output devices which may be coupled to the character resource management system. A third management unit is coupled to the second management unit and manages information regarding character patterns identified by the character pattern sets and code systems which may be used for the character pattern sets. It also manages character code pattern information corresponding to each code in each code system without duplication of the character code pattern information. A fourth management unit, coupled to the third management unit, manages sharing relationships between a plurality of code systems. Each of the sharing relationships comprises a codes in the plurality of code systems which share the same character code pattern information. Thus, a character resource formed of information managed by the above first to fourth management unit is loaded down into the output device.

According to the present invention, as duplication of management of character code pattern information is avoided, the management of the character code pattern information can be effectively carried out.

Another object of the present invention is to provide a character resource management system in which a character weight of a character resource can be unrestrictedly selected by a user.

The above objects of the present invention are achieved by a character resource management system for managing character resources to be down loaded into an output device. The character resource management system comprises a first management unit for managing character styles of the character resources which may be loaded down into the output device. Additionally, a second management unit, coupled to the first management unit, for managing character code pattern information corresponding to each of the character styles managed by the first management unit, the character code pattern information including information representing character sizes and character weights, each character weight representing a degree of thickness of each line forming a character; and setting means, coupled to the first management means and the second management means, for setting relationships between the character styles managed by the first management means and the character code pattern information managed by the second management means, wherein when parameter information representing a character style is supplied to the system, the character code pattern information corresponding to the character style represented by the parameter information is determined with reference to the relationships set by the setting means, so that the character code pattern information is read out from the second management means and loaded down into the output device.

According to the present invention, as relationships between the character code pattern information including the information regarding character sizes and character weights can be changed by the setting means, a character weight of a character resource can be unrestrictedly selected by a user.

Additional objects, features and advantages of the present invention will become apparent from the following detailed description when read in conjunction with the accompanying drawings.

BRIEF DESCRIPTION OF THE DRAWINGS

FIGS. 2A, 2B and 2C are diagrams illustrating examples of a structure of character resources treated in a character resource management system according to the present invention.

DESCRIPTION OF THE PREFERRED EMBODIMENTS

A description will now be given of the principle of a character resource management system according to a first embodiment of the present invention with reference to FIG. 1.

Figure 1:
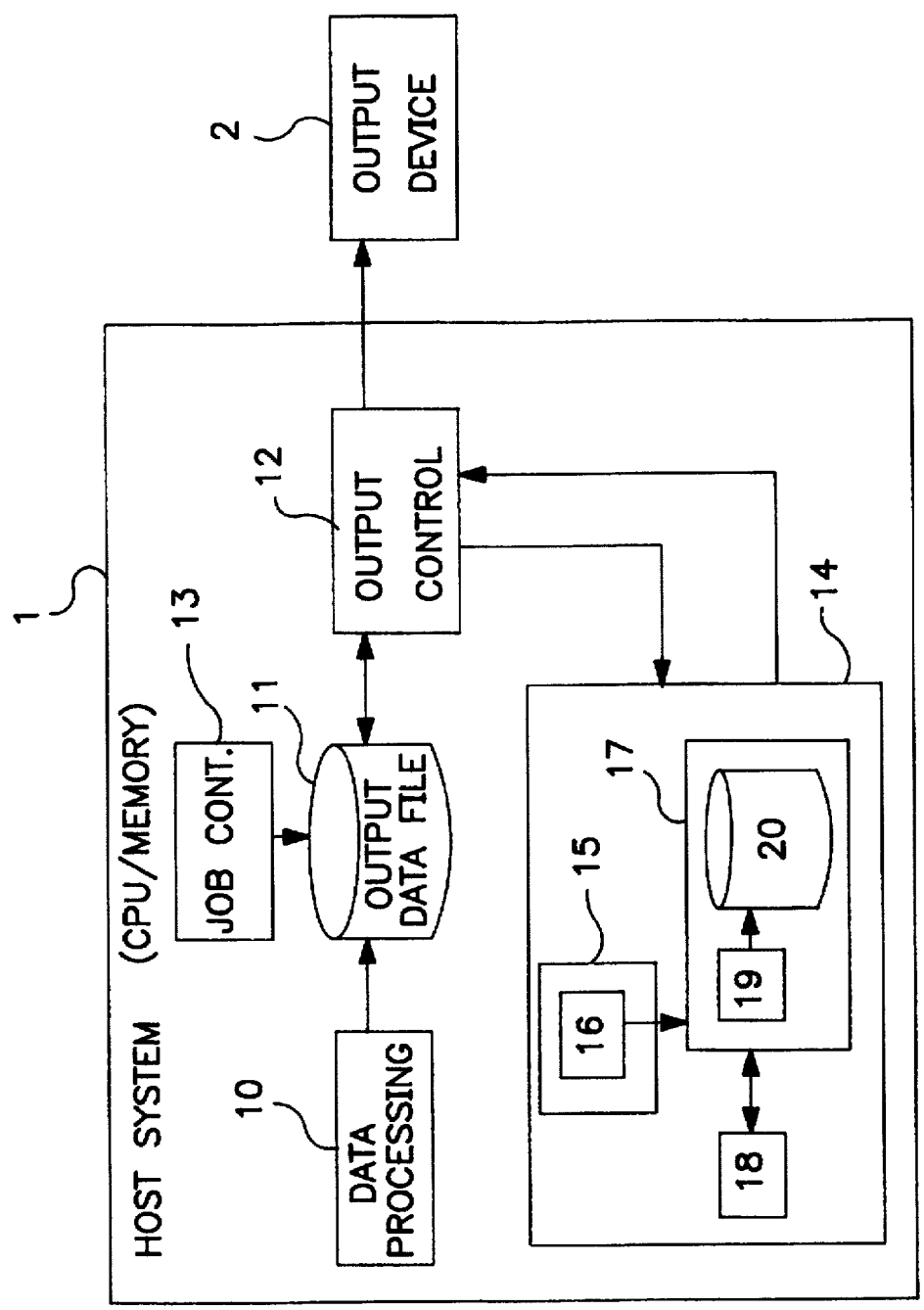
FIG. 1 is a block diagram illustrating a management system according to a first embodiment of the present invention.

Referring to FIG. 1, a host system 1 is coupled to an output device 2 such as a printer. The host system 1 has a data processing unit 10, an output data file 11, an output control unit 12, a job control unit 13 and a management unit 14. The data processing unit 10 executes a data processing of a user task. The output data file 11 stores output data supplied from the data processing unit 10. The output data stored in the output data file 11 is read out and supplied to the output device 2 via the output control unit 12. The output control unit 12 controls information supplied to the output device 2.

The management unit 14 manages information regarding a character resource to be loaded down into the output device 2. The management unit 14 has a style information management part 15, a character pattern name management part 16, a character pattern information management part 17 and a sharing relationship management part 18. The style information management part 15 manages information regarding character styles (e.g. a Ming-style and a Gothic-style, each of which is one of Japanese character styles). The character pattern name management part 16 manages information regarding names of character pattern sets (font sets) which can be used in the character styles. In the character pattern name management part 16, the names of the character pattern sets are grouped in accordance with characteristics of output devices. The information regarding names of character pattern sets is referred to as character pattern name information. The character pattern information management part 17 manages information regarding character patterns, which information is referred to as character pattern information. The character pattern information is formed of first information and second information. The first information is commonly provided to character patterns in a character pattern set identified by the character pattern name information managed by the character pattern name management part 16. The second information is individually provided to each character pattern in each character pattern set. The first information is referred to as common character pattern information. The second information is referred to as character code pattern information (individual information). The character pattern information management part 17 has a common management part 19 and a character code pattern library 20. The common management part 19 manages the common character pattern information. The common character pattern information includes information regarding code systems capable of being used for identifying character patterns in the character pattern sets. The character code pattern library 20 manages the character code pattern information so that code systems correspond to the character code pattern information without overlapping. That is, one content in the character code pattern information does not correspond to a plurality of code systems. The sharing relationship management part 18 manages sharing relationships in each of which a plurality of code systems share the same character code pattern information.

In the system shown in FIG. 1, the character styles, the code systems and the character code pattern information are individually managed in the character source information management unit (management unit) 14. That is, the character style information management part 15 manages the information regarding the character styles, the common management part 19 manages the information regarding the code systems and the character code pattern library 20 manages the character code pattern information. Attributes (the character style, the code system and the character pattern information) which correspond to each other are linked to each other. In this system, even if character sizes of character resources differ from each other, duplication of management of information (the character style, the code systems and the character code pattern information) shared by the character resources is avoided. In a case where the character code pattern information can be accessed by both first and second code systems, the character code pattern information is managed so as to correspond to only the first code system. Then, when the second code system is used for identified characters, the character code pattern information is accessed based on a sharing relationship between the first and second code systems, which relationship is managed by the sharing relationship sharing management part 18. That is, in this case, there is no duplex managements of the character code pattern information corresponding to the first and second code systems.

A down loading process of the character resource is performed as follows.

When the data processing unit 10 is activated, the job control unit 13 supplies parameter information (a character style, a code system and the like), for identifying a character resource to be loaded down into the output device 2, to the output data file 11. When a down loading process is required, the output control unit 12 accesses the management unit 14 and supplies the parameter information filed in the output data file 11 to the management unit 14. The management unit 14 retrieves management data required for identifying the character resource to be loaded down into the output device 2 based on the parameter information. The output control unit 12 supplies the management data retrieved by the management unit 14 to the output device 2, so that the management data is loaded down into the output device 2.

A description will now be given of the first embodiment with reference to FIGS. 2 and 3.

A character resource management system according to the first embodiment of the present invention corresponds to the management unit 14 shown in FIG. 1. The character resource management system is formed of a general computer system having a processing unit and a memory (a data file) and so on.

Figure 2A:
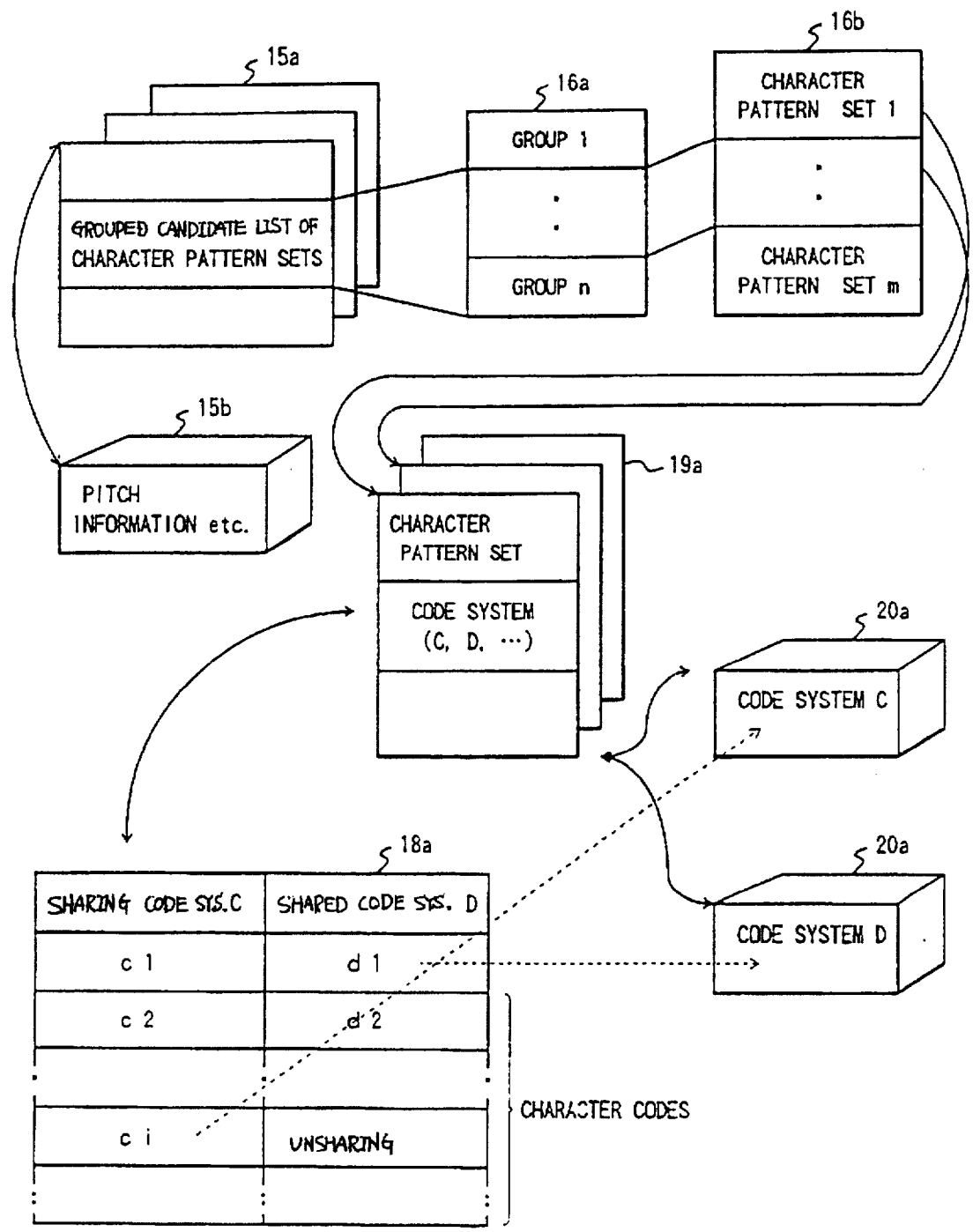

FIG. 2A shows examples of structures of management data managed in the management unit 14 and linkages thereof.

The information regarding character styles includes common style information and individual style information. The common style information is information which is universally given to each character style, such as information regarding character sets capable of representing each character style and information regarding code systems capable of accessing each character style. The individual style information is information which is individually given to each code system, such as information regarding character pitch information representing a pitch at which characters having a character style accessed by each code system can be arranged.

Referring to FIG. 2A, a style common management part 15a manages the common style information given to every character style. The common style information includes information regarding group of character pattern sets capable of representing the character style, information regarding basic structure of characters having the character style and so on. A style individual management part 15b manages the individual style information given to every character style. The individual style information includes information regarding the character pitch information corresponding to each code system capable of accessing the character style. The style common management part 15a and the style individual management part 15b form the style information management part 15 shown in FIG. 1. A output characteristic management part 16a manages output devices capable of connecting this system. The output devices are identified by characteristics thereof (resolution, character pattern sets (font sets) capable of being used therein and the like). A character pattern set management part 16b manages information regarding names of character pattern sets used in each of output devices. The output characteristic management part 16a and the character pattern set management part 16b form the character pattern name management part 16 shown in FIG. 1.

The style common management part 15a has a list indicating candidates for character pattern set capable of representing each character style. The list in the style common management part 15a is linked to information managed in the output characteristic management part 16a. The output devices managed by the output characteristic management part 16a are grouped by characteristics thereof. The output characteristic management part 16a manages, for example, sixteen groups. Each group is linked to the information regarding the names of character pattern sets used in each of output devices, which information is managed in the character set management part 16b. In a case where a first group (1) indicates an output device in which characters represented by laster fonts are printed, information regarding names of character pattern sets, each of which is formed of the laster fonts, is managed by the character pattern set management part 16b. The names of the character pattern sets correspond to sizes of the characters represented by the character pattern sets. For example, m character pattern sets which can represent characters having a size falling within a range of 3–300 point are managed by the character pattern set management part 16b. In a case where a second group (2) indicates an output device in which characters represented by curve-fitting outline fonts are printed, information regarding names of character sets, each of which is formed of the curve-fitting outline fonts, is managed by the character pattern set management part 16b.

According to the above management of character pattern sets, when a character style and a characteristic of the output device 2 are identified, names of the character pattern sets in the character resource are determined.

A common management part 19a corresponding to a block indicated by a reference number 19 in FIG. 1 manages the common character pattern information. The common character pattern information managed by the common management part 19 is linked to the information regarding each of the names of character pattern sets. That is, the common character information provided to a character set identified by each of names of the character sets is managed by the common management part 19a. The common character information includes code systems capable of identifying character patterns in each of the character pattern sets, size information of character patterns in each of the character pattern sets, a range that the character patterns can be reduced and enlarged and so on. In a case where the system is coupled to the output device 2 having a function of reducing and enlargement, a character pattern set to be loaded down into the output device 2 is determined based on the common character information regarding the range that the character patterns can be reduced and enlarged.

A character code pattern library 20a corresponds to a block indicated by a reference number 20 in FIG. 1. The character code pattern library 20a is linked to each of names of the character pattern sets managed by the common management part 19a. The character code pattern library 20a is provided in this system so as to correspond to each of the code systems which are managed, as the common character pattern information, by the common management part 19a. The character code pattern library 20a manages the character code pattern information which is information regarding character patterns accessed by each of the code systems. In a case where the same character code pattern information is shared by a plurality of code systems, a character code pattern library is defined as a main library, and other one or a plurality of character code pattern libraries are defined as sub libraries. In each of the sub-libraries, the character code pattern information shared by the plurality of code systems is not managed. In only the main library, the character code pattern information shared by the plurality of code systems is managed. Thus, duplication of management of character code pattern information shared by the plurality of code systems is avoided. In a case where the Chinese characters can be accessed by using both a Japanese code system and a Chinese code system, a character code pattern library corresponding to the Japanese code system is defined, for example, as the main library. In this case, the character code pattern information regarding the Chinese characters capable of being accessed by using both the Japanese code system and the Chinese code system is managed by only the character code pattern library corresponding to the Japanese code system.

A sharing relationship table 18a is included in the sharing relationship management part 18 shown in FIG. 1. The sharing relationship table 18a indicates a sharing relationship between a code system managed by the main library and that managed by the sub library. FIG. 2A shows a case where a character code pattern library corresponding to a code system C is defined as the sub-library and a character code pattern library corresponding to a code system D is defined as the main library. In a case where there is a sharing relationship between a character code (e.g. c1 or c2) in the code system C and a character code (e.g. d1 or d2) in the code system D, the character code (c1 or c2) in the code system C and a corresponding character code (d1 or d2) in the code system D are indicated in the sharing relationship table 18a. In this case, the character pattern accessed by the character code (c1 or c2) in the code system C is identified by the character code (d1 or d2) in the main library corresponding to the code system D. In a case where a character pattern accessed by a character code ci in the code system C is not provided in the main library corresponding to the code system D, there is no character code (no sharing relationship), in the code system D, corresponding to the character code ci in the sharing relationship table 18a. In only this case, the character pattern accessed by the character code ci in the code system C is provided in the sub library corresponding to the code system C.

In the first embodiment shown in FIG. 2A, the character style of the character resource to be loaded down, the code system and the character code pattern information are individually managed. Attributes (the character style, the code system and the character code pattern information) corresponding to each other are linked to each other. Thus, attributes of the character resource corresponding to parameters supplied by a user are determined. As the sharing relationship between a plurality of code systems is indicated by the sharing relationship table 18a, duplication of management of character code pattern information shared by the plurality of code systems is avoided. As a result, a memory (the character code pattern library 20a) is effectively used for storing the character code pattern information.

The character style information shown in FIG. 2A has, for example, a detailed structure shown in FIG. 2B. Additionally, the character pattern information shown in FIG. 2A has, for example, a detailed structure shown in FIG. 2C.

A description will now be given of a procedure for loading down the character resource to the output device with reference to FIG. 3. The output control unit 12 (as shown in FIG. 1) carries out a down loading process in accordance with the procedure shown in FIG. 3.

Figure 3:
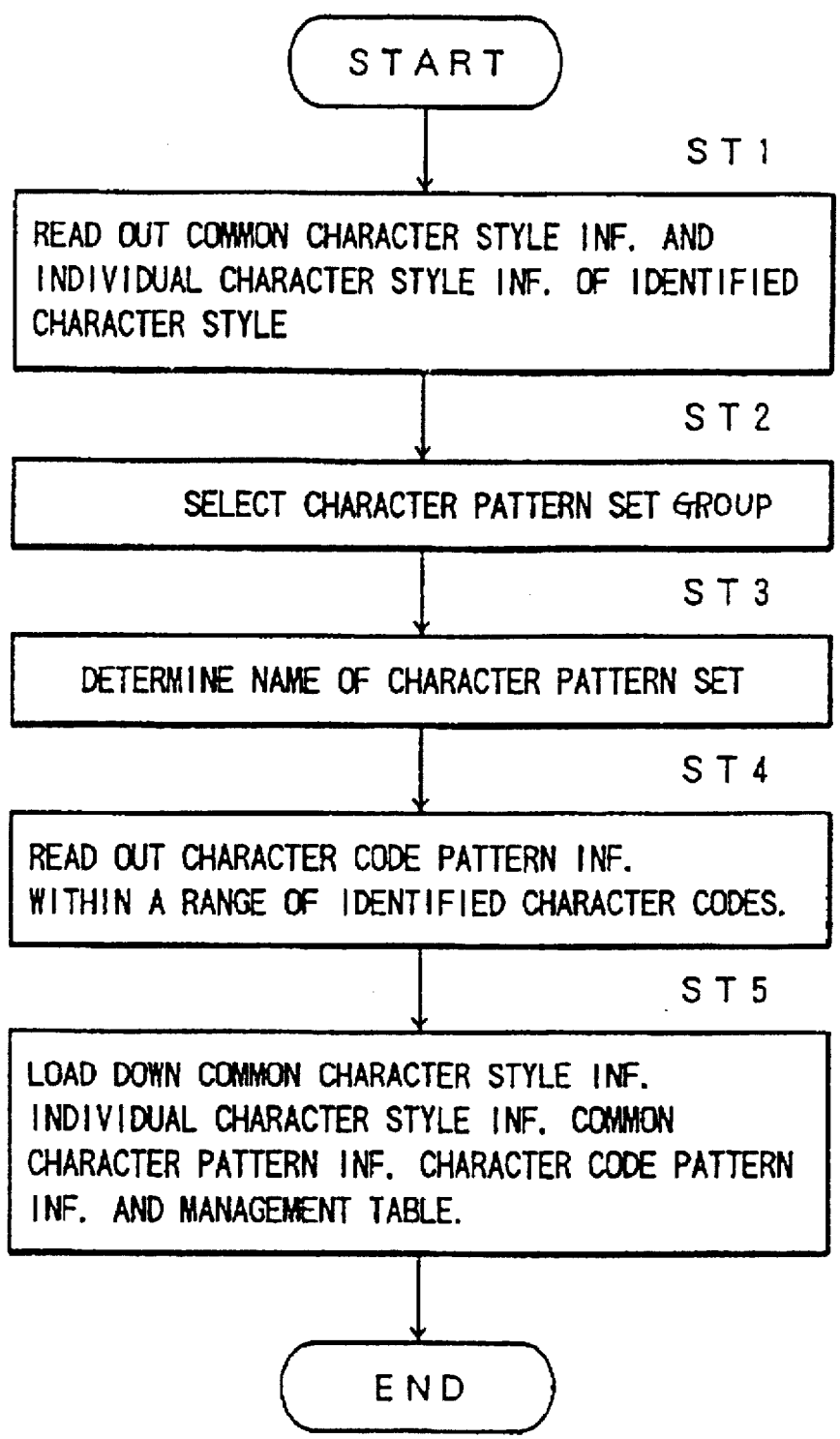
FIG. 3 is a flow chart illustrating a process for loading down the character resource into an output device.

Referring to FIG. 3, when a down loading process is required, a character style of a character resource to be loaded down is identified by parameters supplied from the job control unit 13 (FIG. 1), in step 1. Then common style information is read out from the style common management part 15a (FIG. 2A) linked to the identified character style. Individual style information corresponding to code systems included in the common style information is read out from the style individual management part 15b (FIG. 2B) linked to the identified character style. In step 2, once in communication with the output device 2 (FIG. 1), a group including a characteristic of the output device 2 is selected from the groups in the output characteristic management part 16a (FIG. 2A) which is identified by a candidate list of the character pattern sets included in the common style information. In step 2, for example, the group (1) shown in FIG. 2A is selected. Then step 3 selects a name of a character pattern set corresponding to a character size identified by the parameter information in accordance with management data in the common management part 19a(FIG. 2A). The common management part 19a is linked to names of character pattern sets in the character pattern set management part 16b (FIG. 2A), and the character pattern set management part 16b is linked to the group selected in step 2.

In step 4, character patterns (character code pattern information) corresponding to character codes identified by the parameter information are read out from the character code pattern libraries 20a with reference to the sharing relationship table 18a linked to the common management part 19a (as shown in FIG. 2A) corresponding to the name of the character set selected in step 3. In step 4, a process is carried out as follows. It is determined whether or not there are sharing relationships in a set of the character codes identified the parameter information with reference to the sharing relationship table 18a. In a case where there is a sharing relationship, a character pattern identified by a character code is read out from the shared library. In a case where there is no sharing relationship, a character pattern identified by a character code is read out from the sharing library. In a case shown in FIG. 2A, for example, when a character code c1 in the code system C is identified by the parameter information, a character pattern identified by a character code d1 is read out from the shared library corresponding to the code system D. When a character code ci in the code system C is identified by the parameter information, a character pattern identified by the character code ci is read out from the sharing library corresponding to the code system C.

After the common style information, the individual style information, the common character pattern information and the character code pattern information (the character patterns) are read out and the sharing relationship table 18a is selected, in step 5, the above information is down loaded, as management data, to the output device 2. In a case where the management data includes information which is not used for processing in the output device 2, the output control unit 12 deletes the information (such as groups in the output characteristic management part 16a, each of which does not correspond to a characteristic of the output device 2, from the management data to be loaded down into the output device 2.

After the above management data is loaded down in the output device 2, the output device 2 carries out an output processing with respect to output data supplied from the data processing unit 10 in accordance with the following procedures.

The output device 2 retrieves the common character pattern information of character pattern sets in the candidate list of the character pattern sets. A character pattern set corresponding to a size of character to be output is selected based on the common character pattern information. Then, a character pattern corresponding to a character code supplied from the data processing unit 10 is read out from the character source loaded down in the output device 2 with reference to the sharing relationship table 18a. A character represented by the character pattern is printed.

A description will now be given of the principle of a character resource management system according to a second embodiment of the present invention with reference to FIG. 4. In the second embodiment, character patterns identified by the parameter information can be effectively read out from the character code pattern library 20 shown in FIG. 1.

Figure 4:
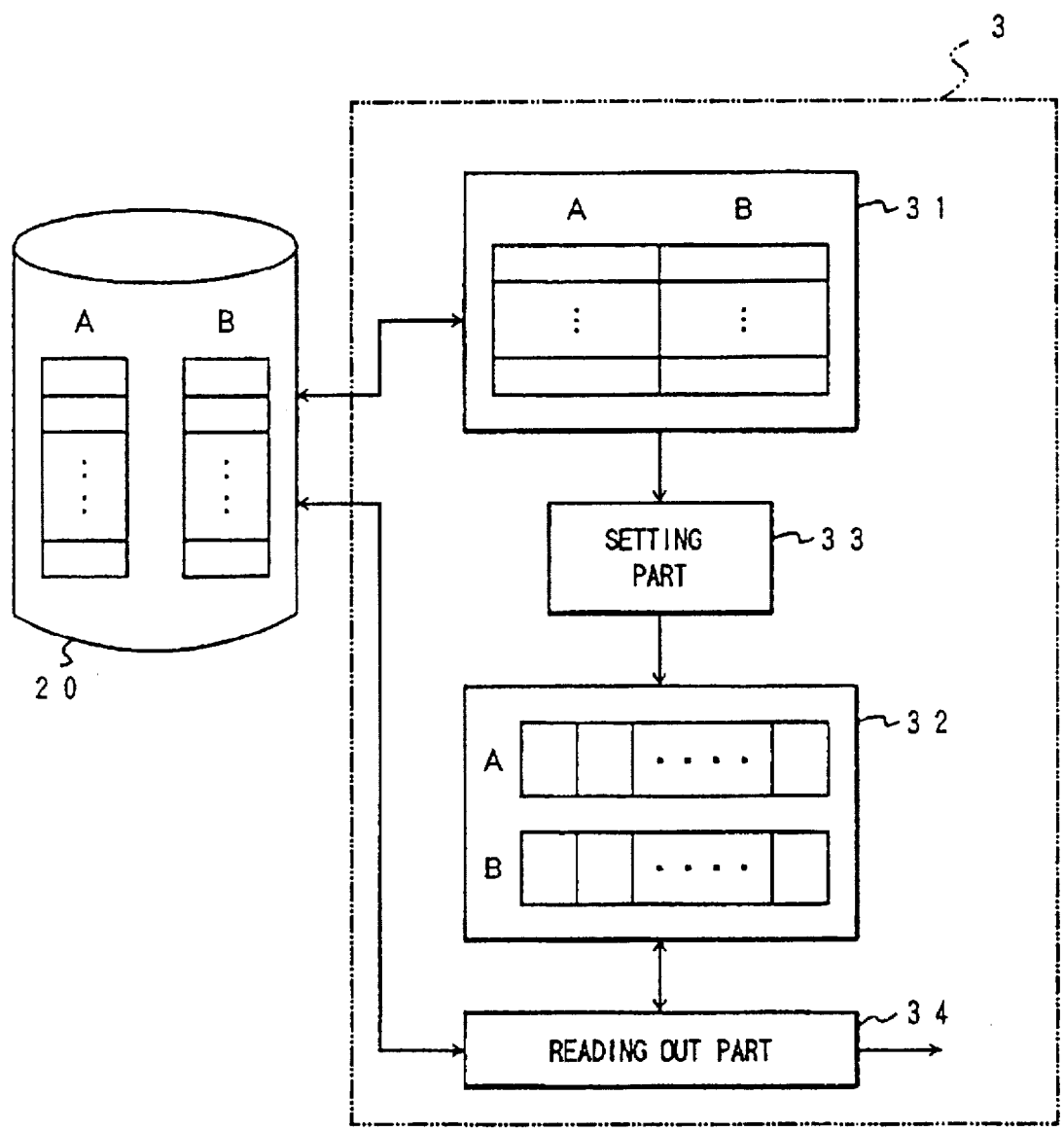
FIG. 4 is a block diagram illustrating a data output unit provided in a management system according to a second embodiment of the present invention.

Referring to FIG. 4, a data output unit 3, coupled to the character code pattern library 20, is provided in the output control unit 12 shown in FIG. 1. The data output unit 3 is formed of a general computer system having a CPU (Central Processing Unit) and a memory. The character code pattern library 20 manages the character code pattern information corresponding to each code system so that duplication of management is avoided, as described in the first embodiment. The data output unit 3 has a sharing relationship management part 31, a bit-string management part 32, a setting part 33, and a reading out part 34. The sharing relationship management part 31 manages a sharing relationship of character code pattern information shared by a plurality of code systems. The bit-string management part 32 manages a bit-string having the number of bits corresponding to the number of character codes in each of code systems. The setting part 33 sets reading out flags in the bit-string managed by the bit-string management part 32 in accordance with management data in the sharing relationship management part 31. The reading out part 34 reads out the character code pattern information, in accordance with the bit-string managed in the bit-string management part 32, from the character pattern code library 20.

The sharing relationship management part 31 has a table representing a sharing relationship between the code systems identifying the character code pattern information in the character code pattern library 20, such as the sharing relationship table 18a shown in FIG. 2A. The bit-string management part 32 includes bit-strings corresponding to the code systems identifying the character code pattern information in the character code pattern library 20. Each bit-string has the number of bits corresponding to character codes in a corresponding code system. The setting part 33 sets reading out flags at bits in the bit-strings, each bit corresponding to a character code identifying one of character patterns to be loaded down into the output device, with reference to the table in the sharing relationship management part 31. For example, in a case where the character code pattern information is shared by code systems A and B, bit-strings corresponding to the code systems A and B are managed by the bit-string management part 32. In this case, when the character code pattern information to be loaded down into the output device 2 is identified by character codes in the code system A, reading out flags are set at corresponding bits in the bit-string corresponding to the code system A. When the character code pattern information to be loaded down into the output device 2 is identified by character codes in the code system B, reading out flags are set at corresponding bits in the bit string corresponding to the code system B. After this, the reading out part 34 accesses the character code pattern library 20 block by block, each block corresponding to a plurality number of character codes arranged in increasing order from a minimum. The reading out part 34 reads out, with reference to the bit-strings in the bit-string management part 32, character code pattern information identified by character codes, in each block, corresponding to the bits at which the reading flags are set in the bit-strings, from the character code pattern library 20.

In the second embodiment, the character codes identifying the character code pattern information to be loaded down into the output device 2 are determined by the bit-strings. After this, the character code pattern information is read out from the character pattern code library 20 with reference to the bit-strings. When the character code pattern information is read out, the character code pattern library 20 is accessed block by block. Thus, a probability that a plurality number of character codes identifying the character code pattern information to be loaded down into the output device 2 is included in each block is increased. That is, the character code pattern information can be effectively read out from the character code pattern library 20.

Figure 5:
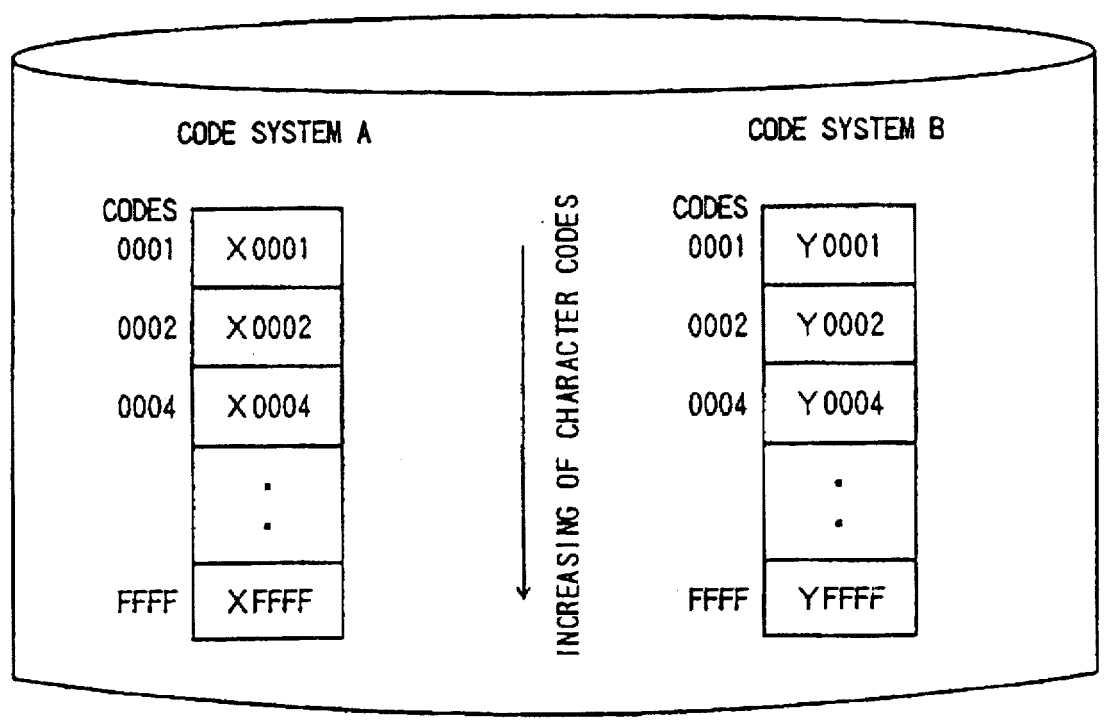
FIG. 5 is a detailed diagram illustrating a character code pattern library shown in FIG. 4.
Figures 6, 7:
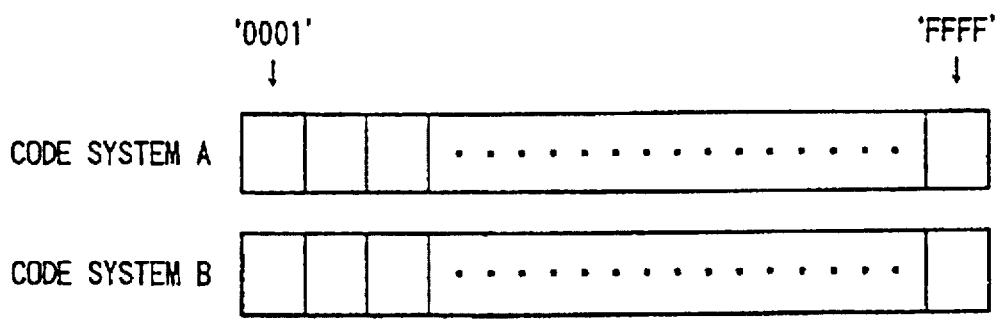
FIG. 6 is a diagram illustrating a table representing a relationship of sharing character code pattern between code systems A and B.
FIG. 7 is a diagram illustrating bit-strings corresponding to the code systems A and B.

A description will now be given of the second embodiment of the present invention with reference to FIGS. 5 through 8. FIG. 5 shows an example of management data in the character code pattern library 20 shown in FIG. 4, FIG. 6 shows an example of management data in the sharing relationship management part 31 shown in FIG. 4, and FIG. 7 shows an example of management data in the bit-string management part 32 shown in FIG. 4.

Referring to FIG. 5, character code pattern information identified by a code system A and character code pattern information identified by a code system B are managed by the character code pattern library 20. Each of the code systems A and B is constituted by two bytes. There is a sharing relationship between the code systems A and B. In the character code pattern library 20, the character code pattern information is managed so that an i-th character code in the code system A corresponds to the character code pattern information Xi, and an i-th character code in the code system B corresponds to the character code pattern information Yi. Each of character codes in the code systems A and B are arranged in the increasing order from the minimum (0001) to the maximum (FFFF). The sharing relationship management part 31 manages a sharing relationship between the code systems A and B based on a table shown in FIG. 6. The table shown in FIG. 6 has the same form as the sharing relationship table 18a described in the first embodiment shown in FIG. 2A. The character code pattern library 20 has a sharing library corresponding to the code system A and a shared library corresponding to the code system B. Referring to FIG. 6, when character code pattern information is shared by character codes in the code systems A and B, each character code in the code system A corresponds to a character code in the code system B in the table. When character code pattern information is not shared by character codes in the code systems A and B, there is not character code in code system B corresponding to each character code in code system A in the table shown in FIG. 6. The bit-string management part 32 manages bit-strings corresponding to the code systems A and B, which bit-strings are shown in FIG. 7. Bits in each of the bit-strings shown in FIG. 7 corresponds to the character codes "0001" to "FFFF".

Figure 8:
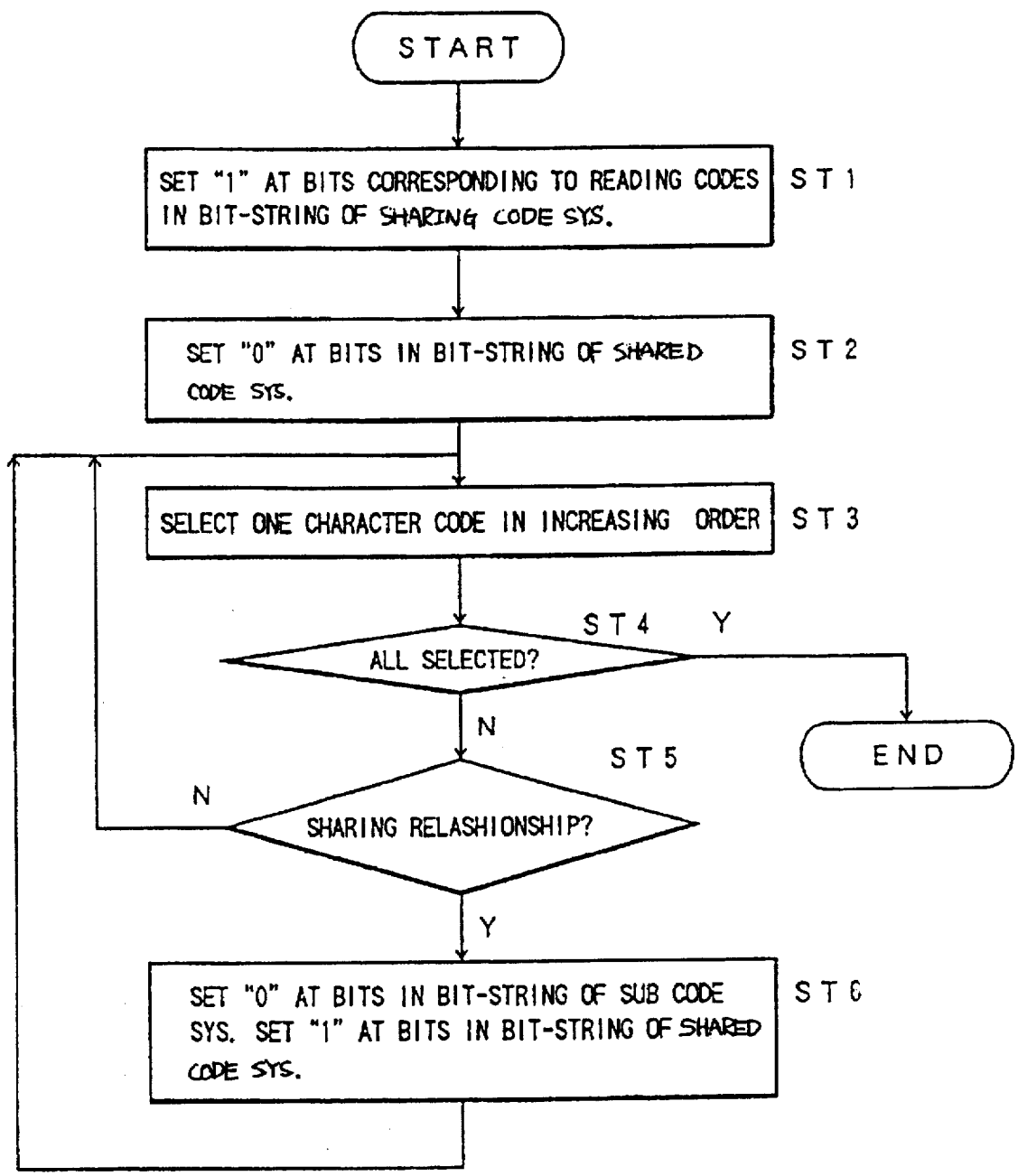
FIG. 8 is a flow chart illustrating a process carried out in a bit setting part shown in FIG. 4.

The setting part 33 sets read out flags in accordance procedure shown in FIG. 8. When a read out requirement is supplied from the character code pattern library, the setting part 33 sets "0" or "1" (the reading out flag) at bits in the bit-strings in the bit-string management part 32 in accordance with the procedure shown in FIG. 8.

Referring to FIG. 8, the bit-string corresponding to the code system A (the sharing library) is processed by step 1 (ST1), and the bit-string corresponding to the code system B (the shared library) is processed by step 2 (ST2). In step 1, bits corresponding to character codes identifying character code pattern information to be read out is set to "1". For example, in a case where character codes "0100" to "1800" identify the character code patterns to be read out from the library 20, the bits corresponding to the character codes "0100" to "1800" are set to "1" in the bit-string corresponding to the code system A. Other bits in the bit-string corresponding to the code system A are set to "0". In step 2, all bits in the bit-string corresponding to the code system B are set to "0". After this, in step 3 (ST3), one of the character codes identifying the character code pattern information to be read out is selected in increasing order from the minimum. Step 4 (ST4) determines whether or not all character codes identifying the character code pattern information to be read out have been selected in step 3 (ST3). If the result obtained by step 4 is No, step 5 (ST5) determines whether or not there is a sharing relationship in the character code selected in step 3 with reference to the table shown in FIG. 6. In a case where there is no sharing relationship in the selected character code, the process returns to step 3, then the next character code identifying the character code pattern information to be read out is selected. When there is sharing relationship in the selected character code, the bit corresponding to the selected code in the bit-string corresponding to the code system A is reset to "0" in step 6 (ST6). Then, a bit corresponding to the selected code in the bit-string corresponding to the code B is set to "1". After step 6, the process returns to step 3. When step 4 determines that all character codes identifying the character code pattern information to be read out have been selected in step 3, the process is finished (END).

In the table shown in FIG. 6, a character code "0103" in the code system A and a character code "b0103" share the same character code pattern information. In this case, a bit corresponding to the character code "0103" is reset to "0" in the bit-string corresponding to the code system A. A bit corresponding to the character code "b0103" is set to "1" in the bit-string corresponding to the code system B. The character code pattern information identified by the character code "0104" in the code system A is not shared by the code system B. In this case, a bit corresponding to the character code "0104" is maintained at "1" in the bit-string corresponding to the code system A.

In a case where character code pattern information to be read out is stored in the sharing library corresponding to the code system A, a bit corresponding to a character code identifying the character code pattern information to be read out is set to "1" in the bit-string corresponding to the code system A. In a case where character code pattern information to be read out is stored in the shared library corresponding to the code system B, a bit corresponding to a character code identifying the character code pattern information to be read out is set to "1" in the bit-string corresponding to the code system B.

Character codes in the character code pattern library 20 are accessed by the read out part 34, block by block. In a case where character codes included in each block correspond to bits set to "1" in the bit-string corresponding to the code system A, character code pattern information identified by the character codes is read out from the sharing library in the character code pattern library 20. In a case where character codes included in each block corresponds to bits set to "1" in the bit-string corresponding to the code system B, character code information identified by the character codes is read out from the shared library in the character code pattern library 20.

According to the second embodiment, in both cases where the character code pattern information is read out from the sharing library and the shared library, a probability that the character code pattern information identified by a plurality number of character codes is read out in one accessing process is increased.

Figure 9:
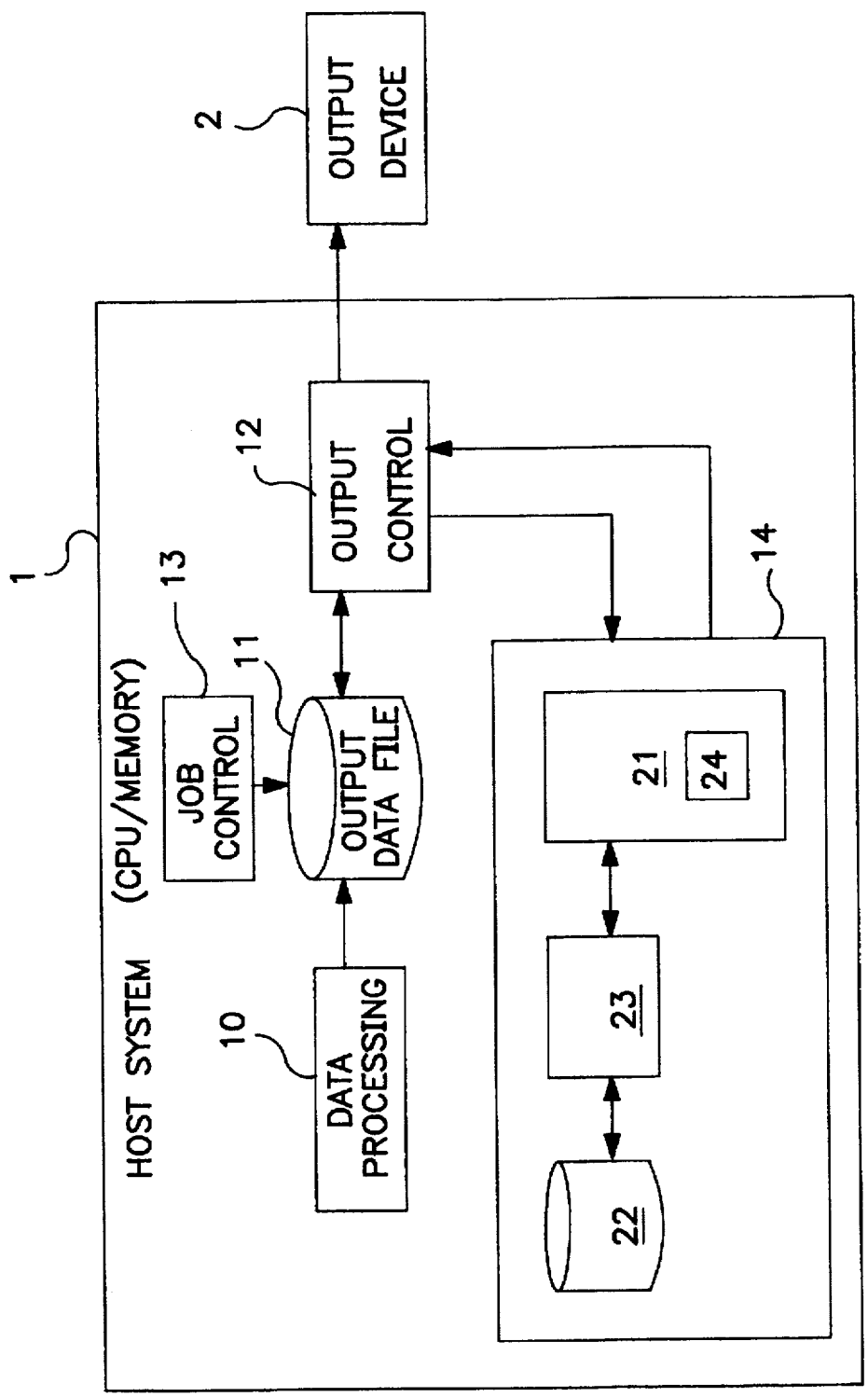
FIG. 9 is a block diagram illustrating a management system according to a third embodiment of the present invention.

A description will now be given of the principle of a character resource management system according to a third embodiment of the present invention with reference to FIG. 9. In FIG. 9, those parts which are the same shown in FIG. 1 are given the same reference numbers.

Referring to FIG. 9, a host system 1 has a data processing unit 10, an output data file 11, an output control unit 12, a job control unit 13 and a management unit 14. An output device 2 is coupled to the host system 1. The management unit 14 has a character style management part 21, a character code pattern library 22 and a character pattern management part 23. The character style management part 21 manages information regarding a character style of a character resource to be loaded into the output device 2. The character code pattern library 22 manages character code pattern information of character styles prepared in this system based on a character size and a character weight. The character weight is referred to as a thickness of each line forming a character. The character pattern management part 23 manages information regarding names of character pattern sets which can be used for the character styles managed by the character style management part 21. The character style management part 21 includes a relationship setting part 24. The relationship setting part 24 sets relationships between the character styles and the names of the character pattern sets.

In the system shown in FIG. 9, the information regarding character styles and character code pattern information are individually managed. The relationship setting part 24 in the character style management part 21 sets relationships between the character styles and the names of the character pattern sets based on instructions supplied from a user via an interactive I/O unit. That is, when the relationship setting part 24 changes the names of the character pattern sets corresponding to the character style based on the instruction from the user, a character size and a character weight of the character resource to be loaded into the output device 2 are changed. Thus, characters each having a character size and a character weight which are desired by the user, can be printed by the output device 2.

In this system in FIG. 9, a down loading process is carried out as follows.

When the data processing unit 10 is activated, the job control unit 13 supplies parameter information, identifying a character resource to be loaded down into the output device 2, to the output data file 11. The parameter information from the job control unit 13 is stored in the output data file 11. In this state, when it is required for loading down the character resource into the output device 2, the output control unit 12 determines a character style and a character size of the character resource to be loaded down into the output device 2 based on the parameter information stored in the output data file 11. Then, character code pattern information (a character pattern set), having the character style and the character size which are determined by the output control unit 12 and the character weight desired by the user, are determined based on management data in the character pattern management part 23. The character code pattern information is read out from the character code pattern library 22 and loaded down into the output device 2.

According to the above system shown in FIG. 9, the output device 2 can output (print) characters, each having a character weight desired by the user.

Figure 10:
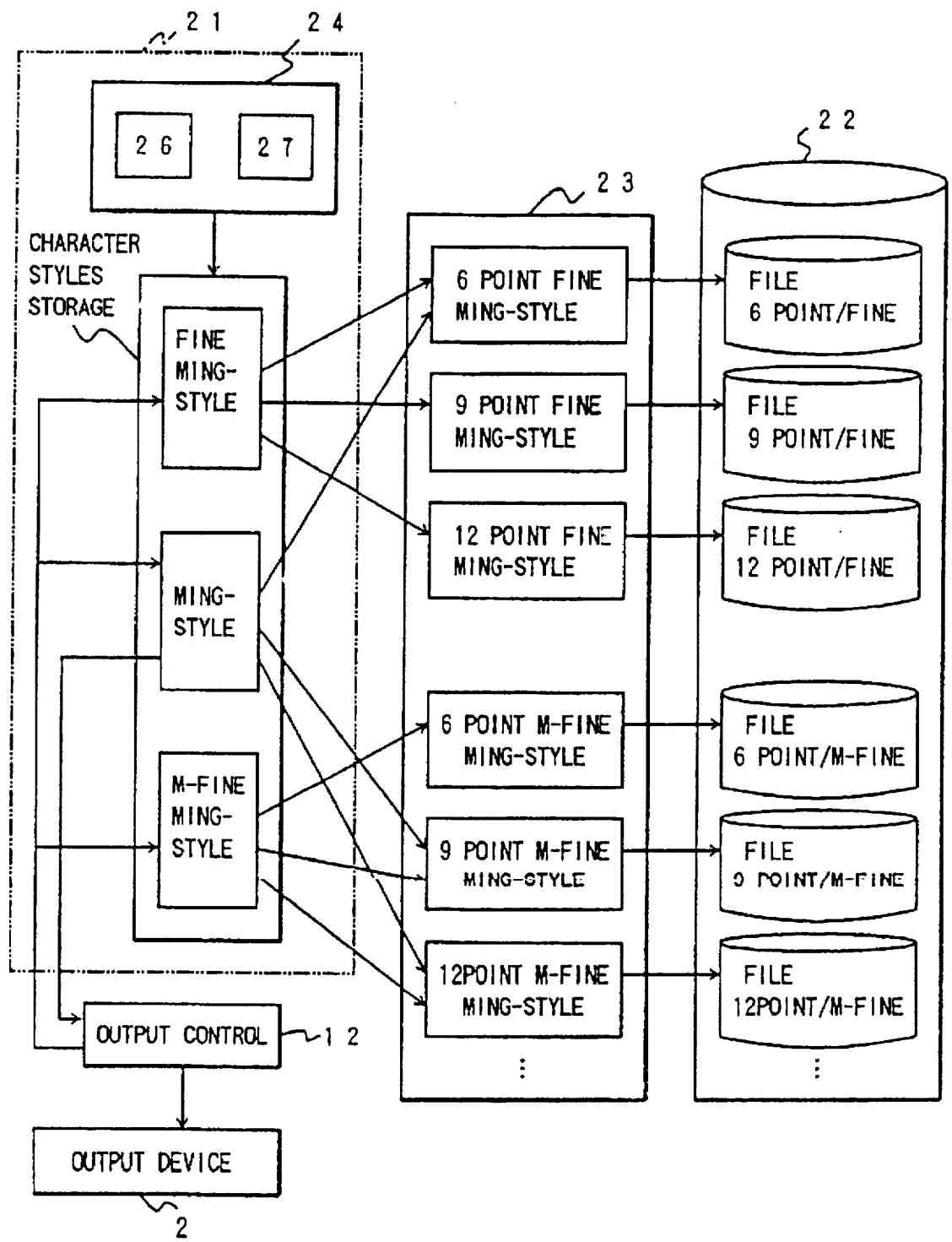
FIG. 10 is a block diagram illustrating a management unit shown in FIG. 9.

A description will now be given of the third embodiment of the present invention with reference to FIG. 10. In FIG. 10 those parts which are the same as those shown in FIG. 9 are given the same reference numbers. FIG. 10 shows a detailed structure of the management unit 14 shown in FIG. 9.

Referring to FIG. 10, the character pattern management part 23 manages names of character pattern sets represented by character code pattern information registered in the character code pattern library 22. The relationship setting part 24 includes a registration part 26 and a linkage setting part 27. The registration part 26 controls the character style management part 21 so that new character style information is registered into the character style management part 21. The linkage setting part 27 sets and changes linkages between the character styles registered in the character style management part 21 and names of character sets managed by the character pattern management part 23.

Two standard character styles have been previously supplied to the system shown in FIG. 10. The first standard style is referred to, for example, as a fine Ming-style, and the second standard style is referred to, for example, as a medium-fine Ming-style. A character weight of the fine Ming-style is less than that of the medium fine Ming-style. In this case, the character style management part 21 manages the character style information regarding the fine Ming-style and the medium fine Ming-style. The character code pattern library 22 manages the character code pattern information having character sizes which are used by the fine Ming-style and the medium fine Ming-style. The character pattern management part 23 manages information regarding names of character sets of the fine Ming-style and the medium fine Ming-style registered in the character code pattern library 22.

When a user desires to print characters by a new character style having a new character weight, the user inputs information regarding the new character style via the interactive I/O unit. The input information regarding the character style is registered in the character style management part 21 by the registration part 26. For example, information regarding a "new Ming-style" is registered in the character style management part 21. A character weight of the "new Ming-style" differs from those of the fine Ming-style and the medium fine Ming-style. Then when the user input linkage relationships between the "new Ming-style" and the names of the character pattern sets registered in the character pattern management part 23 via the interactive I/O unit, the linkage setting part 27 sets the linkages between the "new Ming-style" and the names of the character pattern sets.

When the "new Ming-style" is linked, for example, to three names of character pattern sets, "6 point fine Ming-style", "9 point medium fine Ming-style" and "12 point medium fine Ming-style", registered in the character pattern management part 23, the "new Ming-style" which can be represented by three character sets having character sizes of 6 point, 9 point and 12 point is defined in this system.

When the parameter information regarding a character style and a character size corresponding to the character style is supplied to the output control unit 12, a name of a character set having the character style and the character size is determined based on management data in the character style management part 21. The character code pattern information corresponding to the name of the character set is read out from the character code pattern library 22. Then the character code pattern information read out from the character code pattern library 22 is loaded down into the output device 2. When the "new Ming-style" having the new character weight is defined in the system, the character code information corresponding to the "new Ming-style" can be loaded into the output device 2. As a result, characters each having a character size (6 point, 9 point or 12 point) and new character weight can be printed by the output device 2.

The present invention is not limited to the aforementioned embodiments, and variations and modifications may be made without departing from the scope of the claimed invention.

What is claimed is:

1. A character resource management system for managing character resources to be down loaded into a selected output device, said character resource management system comprising:

first management means for managing character styles of the character resources to be down loaded into the selected output device;

second management means, coupled to said first management means, for managing character pattern sets used for the character styles managed by said first management means, each of said character pattern sets corresponding to one of a plurality of characteristics of output devices selectable for coupling to said character resource management system;

third management means, coupled to said second management means, for managing information regarding character patterns identified by the character pattern sets and by a plurality of code systems which are usable for the character pattern sets, said plurality of code systems having the same code length, and for managing character code pattern information corresponding to each code in each of the code systems without duplication of said character code pattern information; and fourth management means, coupled to said third management means, for managing sharing relationships between said plurality of code systems, each of said sharing relationships representing whether a character code in a code system is usable for a character pattern corresponding to a character code in another code system, such that a character resource formed of character styles, character pattern sets, information regarding character patterns and sharing relationships managed by the first, second, third and fourth management means, respectively, is loaded down into the selected output device.

2. A character resource management system as claimed in claim 1, wherein said first management means comprises:

common management means for managing common information which is commonly included in the character styles; and individual management means for managing individual information which is individually included in the character styles.

3. A character resource management system as claimed in claim 1, wherein said third management means comprises:

common management means for managing common character code pattern information which is commonly included in the character patterns; and individual management means for managing the character code pattern information which corresponds to each of the codes in said code systems.

4. A character resource management system as claimed in claim 1, wherein:

said fourth management means comprises a character code pattern library in which the character code pattern information corresponding to the codes in the code systems is stored without duplication of the character code pattern information; and said character resource management system further comprises:

fifth management means for managing bit-strings, each of said bit-strings corresponding to one of the code systems having codes sharing the same character code pattern information, each of said bit-strings having a number of bits equal to a number of codes in each code system, and setting means for setting reading out flags at selected bits in said bit-strings with reference to the sharing relationships managed by said fourth management means, each bit at which one of the reading out flags is set corresponding to a code for accessing the character code pattern information to be loaded down into said selected output device, wherein the character code pattern information accessed by the codes corresponding to the bits at which the reading out flags are set in the bit-strings, is read out from the character code pattern library, and the character code pattern information is loaded down into said selected output device.

5. A character resource management system for managing character resources to be down loaded into an output device, said character resource management system comprising:

first management means for managing character styles of the character resources to be down loaded into the output device;

second management means, coupled to said first management means, for managing character code pattern information corresponding to each of said character styles managed by said first management means, said character code pattern information including information representing character sizes and character weights, each character weight representing a degree of thickness of each line forming a character; and setting means, coupled to said first management means and said second management means, for setting relationships between the character styles managed by said first management means and the character code pattern information managed by said second management means, such that when parameter information representing a character style is supplied to said character resource management system, the character code pattern information corresponding to the character style represented by the parameter information is determined with reference to the relationships set by said setting means, so that the character code pattern information is read out from said second management means and loaded down into said output device.

6. A character pattern management system for managing character patterns for a plurality of code systems which have the same code length, to be down loaded into an output device, said character pattern management system comprising:

a common character pattern management table for storing information indicating whether a character code in a code system is usable for a character pattern corresponding to a character code in another code system; and character pattern loading means for loading a character pattern corresponding to a character code in a code system, to said output device, only when said common character management table has information indicating that the character code in the code system does not use a character pattern corresponding to a character code in another code system.

* * * * *